United States Patent [19]

Latosky

[11] Patent Number: 4,872,916
[45] Date of Patent: Oct. 10, 1989

[54] PHOSPHATE ESTER PIGMENT DISPERSANT

[75] Inventor: Joseph A. Latosky, Cincinnati, Ohio

[73] Assignee: Sun Chemical Corporation, Fort Lee, N.J.

[21] Appl. No.: 248,002

[22] Filed: Sep. 22, 1988

[51] Int. Cl.⁴ .............................................. C08K 5/00
[52] U.S. Cl. .................................. 106/503; 106/493; 106/497
[58] Field of Search ....................... 106/493, 497, 503

[56] References Cited

U.S. PATENT DOCUMENTS

| | | | |
|---|---|---|---|
| 3,713,859 | 1/1973 | Hoover et al. | 106/503 |
| 3,874,891 | 4/1975 | Grohman et al. | 106/503 |
| 4,055,439 | 10/1977 | Bäbler et al. | 106/503 |
| 4,186,028 | 1/1980 | Woditsch et al. | 106/503 |
| 4,350,535 | 9/1982 | Ishijima et al. | 106/493 |
| 4,698,099 | 10/1987 | Nakamura et al. | 106/493 |
| 4,704,165 | 11/1987 | Nakamura et al. | 106/493 |

*Primary Examiner*—Paul Lieberman
*Assistant Examiner*—Willie J. Thompson
*Attorney, Agent, or Firm*—Jack Matalon

[57] ABSTRACT

An aqueous pigment dispersion containing as the dispersing agent a phosphate ester salt having the general formula:

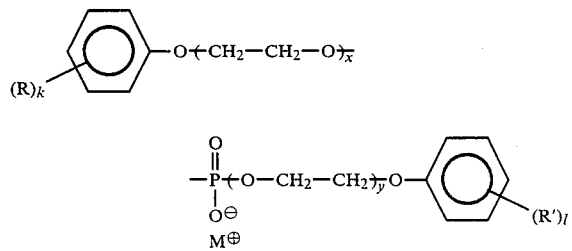

wherein:
R and R' are the same or different linear or branched alkyl groups of 2 to 12 carbon atoms;
k and l are the same or different integers having a value of 1 or 2;
x and y are the same or different integers having values of greater than 1 but less than 13; and,
M is a cation selected from the group consisting of potassium, sodium and ammonium. The dispersing agent is especially useful to disperse azo type pigments. The resulting pigment dispersion exhibits improved stability.

15 Claims, No Drawings

PHOSPHATE ESTER PIGMENT DISPERSANT

BACKGROUND OF THE INVENTION

1. Field of the Invention

The present invention relates to pigment dispersing agents. More specifically, the present invention relates to a pigment dispersing agent comprising a phosphate ester salt having ethoxylated alkylphenol groups.

2. Description of the Related Art

After a pigment has been manufactured, typically it is formed into a presscake. The pigment presscake may then be dispersed in a dispersing medium. The dispersing medium is either a resin-based system, or an aqueous-based system which is commonly referred to as a surfactant-based system.

Resin-based systems, however, have several general drawbacks. Specifically, resin-based systems have a higher viscosity, thus presenting problems for example in handling. Resin-based systems also exhibit poor compatibility with aqueous pigment dispersions which are often used to impart color to a final product. Also, the resin-based systems encounter disposal problems requiring expensive disposal processes. Presently with particular pigments, however, resin-based systems have been exclusively employed because surfactant-based systems exhibit poor stability. These pigments in particular are: barium lithol; calcium lithol; and lithol rubine.

As mentioned, pigment may be dispersed in surfactant-based systems. In a surfactant-based system the pigment is dispersed in water. A surfactant-based system is not available for barium lithol, calcium lithol or lithol rubine because these pigments exhibit poor stability in this type of system. Specifically, the pigments gel upon storage.

Accordingly, a surfactant-based system which provides both long term storage, and short term storage (at elevated temperatures as is commonly experienced in transportation of the pigment) for these types of pigments is not known, and would be useful for all pigments in general.

SUMMARY OF THE INVENTION

Accordingly, it is an object of this invention to provide a pigment dispersing agent for a dispersion based upon a surfactant system.

It is also an object of the invention to provide a dispersing agent for barium lithol, calcium lithol and lithol rubine pigments in a surfactant-based system.

The foregoing and other objectives are achieved by providing a dispersing agent comprising a phosphate ester salt having ethoxylated alkylphenol groups. The agent has the following general formula:

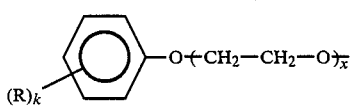

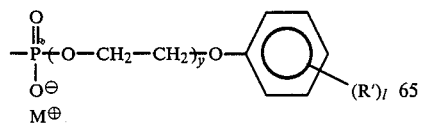

wherein:

R and R' are the same or different, linear or branched alkyl groups of 2 to 12 carbon atoms;

k and l are the same or different integers having the value of 1 or 2;

x and y are the same or different integers having a value of greater than 1 but less than 13; and, M is a cation selected from the group consisting of potassium, sodium and ammonium.

The pigment may be any type, but the dispersing agent is particularly useful for surfactant-based dispersions of azo pigments, and in particular monoazo pigments such as barium lithol, calcium lithol and lithol rubine. In a preferred embodiment R and R' are nonyl groups, the pigment is present in a pigment solids concentration of at least about 10 wt.% (based upon the dispersion weight) and the dispersing agent has a concentration of at least about 10 wt.% (based upon the weight of the pigment).

DETAILED DESCRIPTION OF THE PREFERRED EMBODIMENTS

The present invention is directed to dispersing pigments in surfactant-based systems. After manufacturing, the pigment is usually in the form of a pigment presscake. According to the invention, a pigment dispersing agent is utilized to disperse the presscake to form a pigment dispersion having excellent stability and which may be subsequently utilized in various pigment processes. The pigment may be a pigment solids material which usually comprises a powdered substance which is mixed with a liquid in which it is relatively insoluble and is used to impart color to various materials, e.g., paints, inks, plastics and rubber. In the subsequent pigment processes, the pigment dispersion may be mixed with a different system and then applied to the ultimate product. For example, a pigment dispersion may be formed according to the invention and an ink vehicle may then be added. The pigment dispersion in the ink vehicle could then be used in printing processes.

The dispersing agent used in the present invention, acts as a surfactant. It is a phosphate ester salt of an ethoxylated alkylphenol. The dispersing agent improves stability, both long term (about 6 months–1 year) at room temperature or short term (about three days) at an elevated temperature. The elevated temperature usually occurs during transportation of the pigment and may be as high as 40° C. The structural formula of the dispersing agent is the following:

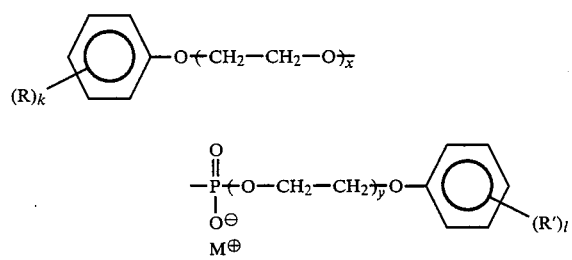

wherein,

R and R' are the same or different, linear or branched alkyl groups of 2 to 12 carbon atoms;

k and l are the same or different integers having a value of 1 or 2;

x and y are the same or different integers having values of greater than 1 but less than 13; and, M is a cation selected from the group consisting of potassium, sodium and ammonium.

The above dispersing agent is available from Hi-Tek Polymers, P.O. Box 1740, 1338 Coronet Drive, Dalton, Ga. 30722-1740. In the above-described formula, R and R' are preferably nonyl.

The dispersing agent may be present in the dispersion in the range of about 10–30 wt.%, based upon the pigment weight. Low levels of dispersing agent can be used as long as the quantity of dispersing agent is sufficient to wet out and disperse the pigment particles. Pigment dispersions with low levels of dispersing agent, however, are easily "shocked" by the addition of the pigment dispersion to other systems, e.g., an ink vehicle. Accordingly, care must be taken in the subsequent pigment dispersion processing when low quantities of dispersing agent are employed. The upper level of dispersing agent quantity in the pigment dispersion is generally governed by the demands of product quality, i.e., production of a workable dispersion. A pigment dispersion with a large quantity of dispersing agent thus contains a relatively large quantity of non-pigment ingredient which may affect the performance of the final product. The preferred percentage of dispersing agent is between about 15–25%.

When pigments are dispersed in surfactant-based systems, a common problem arises involving the stability of the resulting dispersion. Specifically, the conventional surfactant-based pigment dispersions (particularly when dispersing barium lithol, calcium lithol and lithol rubine) gel and become unworkable. It is believed that the gelling results because of interaction between pigment (or other ingredient of the presscake) and an anionic or nonionic group or groups in the conventional dispersing agents. However, in the dispersing agent of the present invention, it is believed that the interaction of the pigment (or other ingredient of the pigment presscake) and the anionic phosphate ester group is minimized by steric hindrance of this group by the not too distant nonylphenol groups.

The dispersing agent of the present invention can be used to disperse a wide variety of pigments. Generally, the pigment may be present in the dispersion in a pigment solids concentration of at least about 10 wt.%, based upon the weight of the dispersion. The maximum pigment solids concentration dispersible by the dispersing agent of the present invention is about 40%. The preferred pigment solids concentration is in the range of about 25–35% pigment solids. Dispersions of low pigment solids exhibit the desired improved stability, i.e., no gelling, but are less economically attractive because of the dispersion's relatively large quantity of non-pigment ingredients.

The preferred pigments dispersible by the dispersing agent of the present invention, are azo pigments in general, and in particular monoazo pigments such as barium lithol, calcium lithol and lithol rubine. These particular pigments are conventionally dispersed in resin-based systems because gelling occurs when they are dispersed in surfactant-based systems. However, according to the present invention these pigments may be dispersed in a surfactant-based system and a pigment dispersion manufacturer can avoid the disadvantages inherent in resin-based systems.

Barium lithol is also known by the common name Lithol Red (barium) (Colour Index Generic name C.I. Pigment Red 49:1), and is an organic pigment belonging to the monoazo chemical class. It is a salt of a 2-naphthol acid dye having the structural formula:

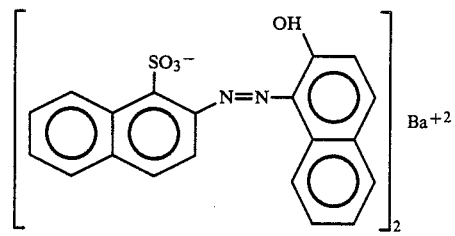

Barium lithol has the Chemical Abstract Index name 1-Naphthalenesulfonic acid, 2[(2-hydroxy-1-naphthalenyl)azo]-, barium salt (2:1) and Chemical Abstract System Registry Number 1103-38-4.

Calcium lithol is known by the common name Lithol Red (calcium) or Lithol Maroon (calcium) (Colour Index Generic name C.I. Pigment Red 49:2) and is also an organic pigment belonging to the monoazo chemical class. Calcium lithol is also a salt of 2-naphthol acid and has the structural formula:

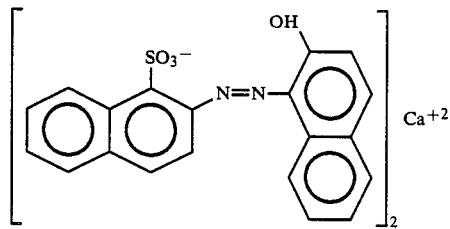

Calcium lithol has the Chemical Abstracts Index name 1-Napthalenesulfonic acid, 2-[(2-hydroxy-1-napthalenyl)azo]-, calcium salt (2:1) and Chemical Abstract System Registry Number 1103-39-5.

Lithol rubine has the common name Lithol Rubine (calcium) or Rubine 46 (calcium) (Colour Index Generic name C.I. Pigment Red 57:1) and is also an organic pigment. It belongs to the monoazo chemical class and is a salt of 2-naphthol acid. Lithol rubine has the structural formula:

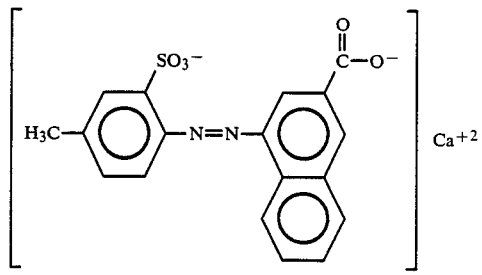

Lithol rubine has the Chemical Abstract Index Name 2-Napthalenecarboxylic acid, 3-hydroxyl-4-[(4-methyl-2-sulfonyl)azo]-, calcium salt (1:1) and Chemical Abstract Registry Number 5281-04-9.

In addition to the above pigments, the dispersing agent of the present invention is applicable to a wide variety of pigments other than the azo type. For example, pigment Rhodamine 6G (CFA), also known as Copper Ferrocyanide Pink, can be dispersed by the dispersing agent of the invention. This pigment is a xanthene type pigment and is a salt of a basic dye; it has the structural formula:

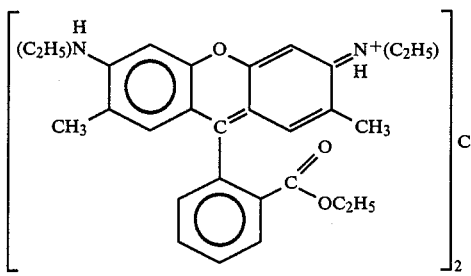

It has the Colour Index Generic name C.I. Pigment Red 169. Its Chemical Abstract System Registry Number is 12224-98-5 C.I. Pigment Red 169.

Another example of a different pigment type dispersible by the dispersing agent of the invention is Quinacridone Violet, also known as Quinacridone Red. This pigment is a quinacridone type pigment. It has the structural formula:

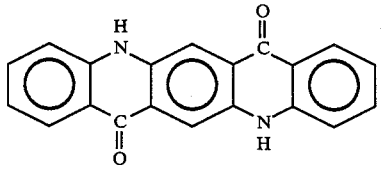

The Chemical Abstract System Registry Number and Index Name for this pigment are: 1047-16-1 and Quino[2,3-b]acridine-7,14-dione, 5,12 dihydro-.

The pigment dispersion according to the present invention can be premixed and milled. The dispersion may also include other compatible components such as antimicrobials. To illustrate the invention, the Example, which follows, sets forth a method whereby a pigment dispersion according to the invention was manufactured.

EXAMPLE

A mixture of 35 parts barium lithol pigment, 7.7 parts of potassium salt of Phosfac 9604 (available from Hi-Tek Polymers, mentioned above) and 0.1 parts of Proxel CRL antimicrobial (available from I.C.I. Americas Company) with the remainder being water were stirred for fifteen minutes in a lab blender. The premix was then milled for fifteen minutes in an Eiger mill to give a product which was then cut to 29% pigment solids. The pH of the dispersion was 7.3. The resulting barium lithol pigment dispersion exhibited excellent stability when aged both at room temperature and at 40° C.

The improved stability of pigment dispersions manufactured according to the present invention is illustrated by the following Table. In the Table, dispersing agents of the present invention were compared with other dispersing agents for stability. In trials 1-3, barium lithol, calcium lithol and lithol rubine, respectively, were dispersed in a surfactant-based system by the dispersing agent of the invention. These dispersions exhibited no gelling for the first 21 days in both long term storage at room temperature and short term storage at elevated temperature (40° C.). With the lithol rubine at 40° C. gelling was observed at 13 days. Dispersions utilizing the conventional dispersing agents Westvaco 1500 (NH4+) and Triton X-100 gelled in as quickly as one day.

TABLE

| Dispersion | First Date Gelling Observed | |
|---|---|---|
| | R.T | 40° C. |
| 1. Barium lithol pigment dispersed in water with a potassium phosphate ester salt of an ethoxylated nonylphenol dispersing agent as in the Example (29% pigment solids) | N.O. | N.O. |
| 2. Calcium lithol pigment dispersed in water with a potassium phosphate ester salt of an ethoxylated nonylphenol dispersing agent (30% pigment solids) | N.O. | N.O. |
| 3. Lithol rubine pigment dispersed in water with a potassium phosphate ester salt of an ethoxylated nonylphenol dispersing agent (32% pigment solids) | N.O. | 13 days |
| 4. Barium lithol pigment dispersed in water with a monocyclic $C_{21}$ dicarboxylic acid dispersing agent (Westvaco 1550 (NH4+)) (29% pigment solids) | 1 day | 1 day |
| 5. Barium lithol pigment dispersed in water with a polyoxyethylated octylphenol dispersing agent (Triton X-100 | 14 days | 2 days |

R.T. = room temperature
N.O. = no gelling observed for first 21 days.

Although the present invention has been described in connection with preferred embodiments thereof, many other variations and modifications will now become apparent to those skilled in the art without departing from the scope of the invention. Therefore, the present invention should not be limited by the specific disclosure herein, but only by the appended claims.

What is claimed is:

1. An aqueous pigment dispersion comprising a pigment and a dispersing agent having the formula:

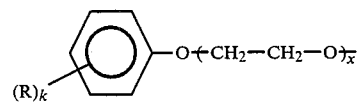

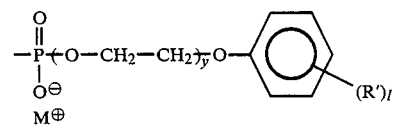

wherein:
R and R' are the same or different, linear or branched alkyl groups of 2 to 12 carbon atoms;
k and l are the same or different integers having a value of 1 or 2;
x and y are the same or different integers having values of greater than 1 but less than 13; and,
M is a cation.

2. A pigment dispersion as claimed in claim 1, wherein the cation is selected from the group consisting of potassium, sodium and ammonium.

3. A pigment dispersion as claimed in claim 1, wherein the pigment is an azo pigment.

4. A pigment dispersion as claimed in claim 3, wherein the azo pigment is selected from the group consisting of barium lithol, calcium lithol and lithol rubine.

5. A pigment dispersion as claimed on claim 1, wherein the pigment is a xanthene pigment.

6. A pigment dispersion as claimed in claim 5, wherein the xanthene pigment is copper ferrocyanide pink.

7. A pigment dispersion as claimed in claim 1, wherein the pigment is a quinacridone pigment.

8. A pigment dispersion as claimed in claim 7, wherein the quinacridone pigment is quinacridone red.

9. A pigment dispersion as claimed in claim 1, wherein R and R' are nonyl groups.

10. A pigment dispersion as claimed in claim 1, further comprising an antimicrobial.

11. A pigment dispersion as claimed in claim 1, wherein the pigment is present in the dispersion at a pigment solids concentration in the range of about 10–40% based upon the dispersion weight.

12. A pigment dispersion as claimed in claim 11, wherein the pigment is present in the dispersion at a pigment solids concentration in the range of about 25–35% based upon the dispersion weight.

13. A pigment dispersion as claimed in claim 1, wherein the dispersing agent is present in the dispersion at a concentration in the range of about 10–30% based upon the pigment weight.

14. A pigment dispersion as claimed in claim 13, wherein the dispersing agent is present in the dispersion in a concentration in the range 15–25% based upon the pigment weight.

15. A method of preparing an aqueous pigment dispersion, comprising stirring a mixture of pigment, water and a dispersing agent having the formula:

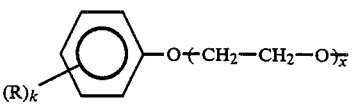

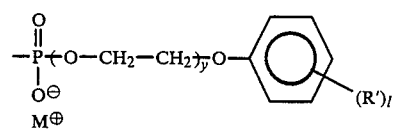

wherein:
R and R' are the same or different, linear or branched alkyl groups of 2 to 12 carbon atoms;
k and l are the same or different integers having a value of 1 or 2;
x and y are the same or different integers having values of greater than 1 but less than 13; and,
M is a cation.

* * * * *